United States Patent Office 2,934,567
Patented Apr. 26, 1960

2,934,567
TREATMENT OF WOOD TAR DISTILLATE

John G. Gatsis, Chicago, Ill., assignor, by mesne assignments, to Universal Oil Products Company, Des Plaines, Ill., a corporation of Delaware No Drawing. Application August 8, 1957
Serial No. 676,924

6 Claims. (Cl. 260—613)

This invention relates to the treatment of wood tar distillate and more particularly to an improved method for separating the components thereof.

The distillation products of wood tar distillate and particularly of hardwoods, including hickory, oak, beech, walnut, etc. are complex mixtures of phenolic and non-phenolic compounds. The non-phenolic compounds are referred to as neutral oils. The phenolic compounds include pyrogallol, 5-alkyl pyrogallols, monomethyl ether of pyrogallol, monomethyl ethers of 5-alkyl pyrogallols, dimethyl ethers of pyrogallol, dimethyl ethers of 5-alkyl pyrogallols, alkylated guiacols, etc. The separation of these components from wood tar distillate is a difficult problem. The pyrogallols and monomethyl ethers of pyrogallols are effective antioxidants for use in the stabilization of organic compounds to retard and/or prevent oxidative deterioration thereof. The use of such compounds as inhibitors in cracked gasoline, mixtures of cracked and straight run gasoline, kerosene, other petroleum distillates, as well as other organic substances, is well known. It will be noted that pyrogallol and monomethyl ethers of pyrogallol contain two hydroxyl groups in ortho position and, therefore, will be referred to in the present specifications and claims as ortho-hydroxyphenols or orthohydroxyphenolic compounds.

The dialkyl ethers of 5-alkyl pyrogallols have been found to be effective non-staining antiozonants for use in preventing the cracking of rubber due to ozone. Because these antiozonants do not impart color to the rubber, they are especially useful in white or light-colored rubber or in dark-colored rubber which is molded to or otherwise adjoins light-colored rubber. On the other hand, the ortho-hydroxyphenolic compounds appear to impart color and, therefore, are not suitable for use in light-colored rubber. Therefore, it is very desirable to separate the ortho-hydroxyphenolic compounds from the dialkyl ethers (mono-hydroxyphenyl compounds) and the present invention is directed to a novel method for effecting this separation.

In one embodiment the present invention relates to the method which comprises treating wood tar distillate with an alkaline borate solution, separating an extract phase containing ortho-hydroxyphenols from a raffinate phase, and recovering ortho-hydroxyphenols from said extract phase.

The wood tar distillate generally is first settled in order to separate a settled tar oil from soluble oil. This settling may be effected at ambient temperature but in many cases preferably is effected at an elevated temperature, which may range up to about 100° C. The settling at elevated temperature also effects removal of volatile components from the wood tar distillate.

While the settled wood tar distillate may be treated in accordance with the present invention and subsequently fractionated to separate the desired selected fraction, in a preferred embodiment the settled wood tar distillate is first fractionated, preferably under subatmospheric pressure to avoid destructive reactions during fractionation, to separate a selected fraction, and the selected fraction then is subjected to treatment in the manner herein set forth. In one embodiment the selected fraction has a nominal boiling range of from about 240° to about 320° C. and in another embodiment it has a nominal boiling range of from about 270° to about 310° C. It is understood that the selected fraction may have any other suitable boiling range as desired.

In accordance with the present invention, the settled wood tar distillate and preferably a selected fraction thereof is subjected to treatment with an alkaline borate solution. A preferred alkaline borate solution comprises aqueous sodium borate solution or an aqueous solution of sodium hydroxide and boric acid. Commercially available Borax ($Na_2B_4O_7 \cdot 10H_2O$) is entirely satisfactory for use in forming the desired aqueous solution. While sodium hydroxide is preferred as the alkaline component, it is understood that other suitable alkaline components may be employed. Other alkaline solutions include those of ammonia, potassium, lithium, calcium, strontium, barium, etc. In general, the hydroxides are utilized in preparing the alkaline solutions although, in some cases, other non-acidic solutions may be utilized. Aqueous solutions are preferred. Alcoholic or other suitable organic solutions may be employed in some cases. The pH of the solution should be greater than 7 and, as will be shown in the examples appended to the present specifications, excellent results are obtained when using solutions having a pH of the order of 8.5–10.

Treatment of the wood tar distillate with the alkaline borate solution may be effected in any suitable manner. In a continuous process, the wood tar distillate and alkaline borate solution are passed countercurrently to each other, the wood tar distillate preferably being introduced into the lower portion of an extraction zone and the alkaline borate solution being introduced into the upper portion thereof. The extraction zone preferably contains suitable contacting means including, bubble trays, perforated decks, side-to-side pans, etc. The extract containing the ortho-hydroxyphenolic compounds settles as a lower phase in the extraction zone and is removed therefrom. The raffinate containing the other constituents of the wood tar distillate is removed from the upper portion of the extraction zone.

In a batch type operation the wood tar distillate and alkaline borate solution are commingled in an extraction zone equipped with a suitable mixing device as for example, motor driven stirring blades. Other means of mixing may be employed including orirfice mixers, pumping the mixture out of and then back into the extraction zone, etc. The mixture then is allowed to settle into two phases, and each phase is separately withdrawn. It is understood that any suitable means for effecting intimate mixing and settling of the different phases may be utilized in the present invention, and also that, in either the continuous or batch type operation, two or more extraction zones may be employed. In the latter embodiment, the zones preferably are connected in series, with the wood tar distillate being introduced into the first extraction zone and the alkaline borate solution being introduced into the last extraction zone and these passed in countercurrent flow.

The extraction is effected in liquid phase. Any suitable temperature may be employed. Extraction is increased by employing elevated temperature and, thus the preferred temperature is within the range of from about 40° C. to about 200° C. at sufficient pressure to maintain substantially liquid phase conditions in the extraction zone. It appears that higher temperatures increase solubility but decrease selectivity. Therefore, the exact temperature to be employed will be selected with reference to the extent of separation and purity desired in relation to the cost involved in utilizing the higher temperature and pressure.

It is believed that a complex is formed between the alkaline borate and the ortho-hydroxyphenols, although applicant does not wish to be limited to this explanation. Accordingly, the alkaline borate will be used in a stoichiometric concentration at least equal to the ortho-hydroxyphenolic compounds contained in the wood tar distillate, although generally an excess of the alkaline borate will be used.

As hereinbefore set forth, the extract phase comprising the aqueous alkaline borate solution and ortho-hydroxyphenolic compounds is withdrawn from the lower portion of the extraction zone and then is treated in any suitable manner to recover the ortho-hydroxyphenolic compound from the solvent solution. While this recovery may be effected at an elevated temperature and particularly the temperature at which the extract phase is withdrawn from the extraction zone, a preferred method is to cool the extract phase to ambient temperature and neutralize the same by addition of a suitable acid. Suitable acids include hydrochloric acid, sulfuric acid, acetic acid, propionic acid, butyric acid, etc., as well as hydrogen sulfide, carbon dioxide, etc. The alkaline metal separates as a salt in the aqueous solution as a lower layer, and the ortho-hydroxyphenolic compounds separate as an upper layer, and each layer is separately withdrawn. When more complete separation is desired, the lower layer may be further treated with a suitable solvent, including ethers, aliphatic alcohols, hydrocarbons, etc., or successively with two or more of these solvents, and the ortho-hydroxyphenolic compounds then are recovered from these solutions. When even more complete separation is desired, the raffinate phase may be further treated with similar solvents in order to recover the small concentration of ortho-hydroxyphenolic compounds not previously separated therefrom in the extraction zone.

When ammonia is used as the alkaline material, the extract from the extraction zone may be distilled to remove ammonia overhead and then the non-volatile material is treated to recover the ortho-hydroxyphenolic compounds. It is understood that the ammonia so recovered or the alkali metal or alkaline earth metal salts recovered in the manner hereinbefore set forth may be converted to the corresponding hydroxide and then reused in the process for further extraction of wood tar distillate.

From the above description, it will be noted that the novel process of the present invention serves to separate the ortho-hydroxyphenolic compounds from the other components of the wood tar distillate. However, as hereinbefore set forth, this separation is very difficult and complete separation of these components is not ordinarily obtained. However, for most purposes, the reduction of the ortho-hydroxyphenol content in the dialkoxyphenolic fraction is sufficient to permit satisfactory use of the latter as an antiozonant. Similarly, the low content of dialkoxyphenols in the ortho-hydroxyphenol product recovered by the present process is sufficiently low to permit satisfactory use of the ortho-hydroxyphenolic product as an antioxidant for the stabilization of organic compounds.

The following examples are introduced to illustrate further the novelty and utility of the present invention but not with the intention of unduly limiting the same.

*Example I*

A commercial settled wood tar distillate was subjected to fractionation to separate a selected fraction having a nominal boiling range of from about 220° to about 320° C. 400 grams of the selected fraction was intimately commingled with 382 grams of sodium borate $(Na_2B_4O_7 \cdot 10H_2O)$ dissolved in 1000 grams of water. The extraction was effected in a turbomixer heated to a temperature of 100° C. Upon cooling, the raffinate phase comprised 147 grams (36.8% by weight of the charge) and contained only 2.5% by weight of ortho-hydroxyphenols. The extract phase was cooled to ambient temperature and then netralized with hydrochloric acid. In order to effect the greatest recovery of ortho-hydroxyphenolic compounds, the neutralized extract was further extracted first with ether and then with isopropyl alcohol. The raffinate phase was extracted with a hexane fraction. The ortho-hydroxyphenolic compounds from the various extracts amounted to a recovery of 11.5% by weight of the wood tar distillate and a total of 94.7% by weight of the ortho-hydroxyphenolic compounds contained in the wood tar distillate.

*Example II*

200 grams of wood tar distillate was intimately mixed at 150° C. in a turbomixer with 96 grams of sodium borate dissolved in 500 grams of water. This solution had a pH of 9.8. The raffinate in this example amounted to 117 grams or 58.5% by weight of the wood tar distillate charged. The ortho-hydroxyphenolic content of the raffinate was 5%. The extract was cooled to room temperature, neutralized with sulfuric acid and then extracted with ether. 87.8% by weight of ortho-hydroxyphenolic compounds contained in the wood tar distillate was recovered. The total extract amounted to 41.5% by weight of the wood tar distillate.

*Example III*

In a run similar to that described in Example II except that a temperature of 125° C. was utilized, a recovery of 93.4% by weight of the ortho-hydroxyphenolic compounds contained in the wood tar distillate was obtained. The raffinate in this example had an ortho-hydroxyphenolic content of 2% by weight. The extract amounted to 41% by weight of the wood tar distillate.

*Example IV*

The alkaline borate solution of this example was prepared by dissolving 62 grams of boric acid and 30 grams of ammonium hydroxide (28% concentration) in 500 grams of water to give a solution having a pH of 8.9. This solution was used to extract another sample of the wood tar distillate at 100° C. The extract phase was withdrawn from the extraction zone and was steam stripped to remove ammonia and then was extracted with chloroform. 86.7% of the orthohydroxyphenolic compounds contained in the wood tar distillate was recovered in this run.

*Example V*

In this example, the alkaline borate solution was prepared by dissolving 32 grams of boric acid and 20 grams of sodium hydroxide in 500 grams of water to produce a solution having a pH of 11.4. 200 grams of wood tar distillate was commingled with the above solution and heated at 150° C. A raffinate phase comprising 108 grams or 54% by weight of the wood tar distillate had an ortho-hydroxyphenol content of 1%. The extract phase comprised 46% by weight of the wood tar distillate and a recovery of 97.1% by weight of ortho-hydroxyphenols contained in the wood tar distillate.

*Example VI*

As hereinbefore set forth, it is essential that an alkaline solution be employed. This is illustrated in the present run in which a boric acid-sodium hydroxide solution was prepared similar to that described in Example V except that the pH of the solution was 6.7. In this run, 32 grams of boric acid and 5 grams of sodium hydroxide were dissolved in 500 grams of water and the solution was used for the extraction of 200 grams of another sample of the wood tar distillate described in Example V. In this case, the raffinate amounted to 45% by weight of the wood tar distillate but had an ortho-hydroxyphenol content of 15% by weight. It will be noted that the ortho-hydroxyphenolic content of the raffinate is excessive.

I claim as my invention:

1. A method for producing a non-staining antiozonant from wood tar distillate containing pyrogallol, monomethyl ethers of pyrogallol and dialkyl ethers of 5-alkyl pyrogallols, which comprises treating said distillate with an aqueous alkaline borate solution in a stoichiometric concentration at least equal to the pyrogallol and monomethyl ethers of pyrogallol present in the distillate, whereby to form an extract phase containing the pyrogallol and monomethyl ethers of pyrogallol and a raffinate phase containing said dialkyl ethers, separating said phases and recovering the raffinate phase as said antiozonant.

2. A method for producing a non-staining antiozonant from wood tar distillate containing pyrogallol, monomethyl ethers of pyrogallol and dialkyl ethers of 5-alkyl pyrogallols, which comprises treating said distillate at a temperature of from about 40° to about 200° C. with an aqueous alkaline borate solution in a stoichiometric concentration at least equal to the pyrogallol and monomethyl ethers of pyrogallol present in the distillate, whereby to form an extract phase containing the pyrogallol and monomethyl ethers of pyrogallol and a raffinate phase containing said dialkyl ethers, separating said phases and recovering the raffinate phase as said antiozonant.

3. The method of claim 2 further characterized in that said distillate is a settled wood tar distillate boiling within the range of from about 270° to about 310° C.

4. The method of claim 2 further characterized in that said borate solution has a pH of the order of 8.5–10.

5. A method for producing a non-staining antiozonant from wood tar distillate containing pyrogallol, monomethyl ethers of pyrogallol and dialkyl ethers of 5-alkyl pyrogallols, which comprises treating said distillate at a temperature of from about 40° to about 200° C. with an aqueous alkaline ammonia borate solution in a stoichiometric concentration at least equal to the pyrogallol and monomethyl ethers of pyrogallol present in the distillate, whereby to form an extract phase containing the pyrogallol and monomethyl ethers of pyrogallol and a raffinate phase containing said dialkyl ethers, separating said phases and recovering the raffinate phase as said antiozonant.

6. A method for producing a non-staining antiozonant from wood tar distillate containing pyrogallol, monomethyl ethers of pyrogallol and dialkyl ethers of 5-alkyl pyrogallols, which comprises treating said distillate at a temperature of from about 40° to about 200° C. with an aqueous alkaline sodium borate solution in a stoichiometric concentration at least equal to the pyrogallol and monomethyl ethers of pyrogallol present in the distillate, whereby to form an extract phase containing the pyrogallol and monomethyl ethers of pyrogallol and a raffinate phase containing said dialkyl ethers, separating said phases and recovering the raffinate phase as said antiozonant.

References Cited in the file of this patent

UNITED STATES PATENTS

| | | |
|---|---|---|
| 2,022,256 | Schuler | Nov. 26, 1935 |
| 2,260,336 | Prescott et al. | Oct. 28, 1941 |
| 2,313,385 | Levesque | Mar. 9, 1943 |
| 2,400,466 | Reiter et al. | May 14, 1946 |
| 2,587,753 | O'Connor et al. | Mar. 4, 1952 |

OTHER REFERENCES

Schultes: Chem. Abstracts, vol. 30 (1936), col. 6723, 1 page.